United States Patent
Imada (10) Patent No.: US 10,100,194 B2
(45) Date of Patent: *Oct. 16, 2018

(54) RESIN COMPOSITION AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,999

(22) Filed: Nov. 1, 2016

(65) Prior Publication Data

US 2017/0369701 A1 Dec. 28, 2017

(30) Foreign Application Priority Data

Jun. 28, 2016 (JP) .................. 2016-128005

(51) Int. Cl.
| | | |
|---|---|---|
| *C08L 69/00* | (2006.01) | |
| *C08K 5/49* | (2006.01) | |
| *C08L 27/18* | (2006.01) | |
| *C08L 67/02* | (2006.01) | |
| *C08L 87/00* | (2006.01) | |

(52) U.S. Cl.
CPC ............... *C08L 69/00* (2013.01); *C08K 5/49* (2013.01); *C08L 27/18* (2013.01); *C08L 67/02* (2013.01); *C08L 87/005* (2013.01); *C08L 2201/02* (2013.01); *C08L 2205/025* (2013.01)

(58) Field of Classification Search
CPC ............... C08L 69/00; C08L 2201/02; C08L 2205/025; C08L 27/18; C08L 67/02; C08L 87/005; C08K 5/49
USPC ........................................... 524/127
See application file for complete search history.

(56) References Cited

U.S. PATENT DOCUMENTS

| | | | |
|---|---|---|---|
| 2011/0229673 A1 | 9/2011 | Kurachi et al. | |
| 2013/0237644 A1 | 9/2013 | Xin et al. | |
| 2014/0296383 A1 | 10/2014 | Xin et al. | |
| 2017/0247538 A1* | 8/2017 | Imada | C08L 69/00 |

FOREIGN PATENT DOCUMENTS

| | | |
|---|---|---|
| JP | 60-130645 A | 7/1985 |
| JP | 2011-148851 A | 8/2011 |
| JP | 2011-195654 A | 10/2011 |
| JP | 2013-147651 A | 8/2013 |

\* cited by examiner

*Primary Examiner* — Angela C Scott
(74) *Attorney, Agent, or Firm* — Sughrue Mion, PLLC (57) ABSTRACT

A resin composition includes a polycarbonate resin; a reaction product of a glycidyl group-containing polyethylene copolymer and a polyethylene terephthalate resin; an unreacted polyethylene terephthalate resin that is not subjected to a reaction with the glycidyl group-containing polyethylene copolymer; an organic phosphorous flame retardant; and a flame retardant antidrip agent, wherein in a resin phase separation structure observed by an electron microscope, the polycarbonate resin and the unreacted polyethylene terephthalate resin form a continuous phase, the reaction product forms a dispersed phase, and a specific surface area of the dispersed phase is 2 or greater.

7 Claims, 1 Drawing Sheet

RESIN COMPOSITION AND RESIN MOLDED ARTICLE

CROSS-REFERENCE TO RELATED APPLICATIONS

This application is based on and claims priority under 35 USC 119 from Japanese Patent Application No. 2016-128005 filed Jun. 28, 2016.

BACKGROUND

1. Technical Field

The present invention relates to a resin composition and a resin molded article.

2. Related Art

In the related art, various resin compositions are provided to be used in various ways. For example, the resin compositions are used in resin molded articles such as various housings and components of home appliances or automobiles, or used in resin molded articles such as housings of business machines and electric and electronic apparatuses.

A polycarbonate resin is a thermoplastic resin having excellent impact resistance, heat resistance, and the like, and is widely used as a resin molded article such as a component and a housing in the field of machines, automobiles, electric equipment, and electronic equipment, and like. Furthermore, the polyethylene terephthalate resin is a resin exhibiting good molding fluidity.

Recently, a resin molded article obtainable from the resin composition is caused to be thin, and the enhancement of the flame retardancy and the surface impact strength of the resin molded article obtainable from the resin composition containing the polycarbonate resin and the polyethylene terephthalate resin is required.

SUMMARY

According to an aspect of the invention, there is provided a resin composition including:
 a polycarbonate resin;
 a reaction product of a glycidyl group-containing polyethylene copolymer and a polyethylene terephthalate resin;
 an unreacted polyethylene terephthalate resin that is not subjected to a reaction with the glycidyl group-containing polyethylene copolymer;
 an organic phosphorous flame retardant; and
 a flame retardant antidrip agent,
 wherein in a resin phase separation structure observed by an electron microscope, the polycarbonate resin and the unreacted polyethylene terephthalate resin form a continuous phase, the reaction product forms a dispersed phase, and specific surface area of the dispersed phase is 2 or greater.

BRIEF DESCRIPTION OF THE DRAWINGS

Exemplary embodiments of the present invention will be described in detail based on the following figures, wherein.

DETAILED DESCRIPTION

Exemplary embodiment of the invention is described as follows. The exemplary embodiment is an example for realizing the invention, and the invention is not limited to the exemplary embodiment.

Resin Composition

The resin composition according to the exemplary embodiment includes a polycarbonate resin, a reaction product of a glycidyl group-containing polyethylene copolymer and a polyethylene terephthalate resin, an unreacted polyethylene terephthalate resin which is not subjected to a reaction with the glycidyl group-containing polyethylene copolymer, an organic phosphorous flame retardant, and a flame retardant antidrip agent. In the resin composition according to the exemplary embodiment, in a resin phase separation structure observed by an electron microscope, the polycarbonate resin and the unreacted polyethylene terephthalate resin form a continuous phase and the reaction product forms a dispersed phase. The polycarbonate resin and the unreacted polyethylene terephthalate resin are sea and the reaction product is an island, which forms so-called a sea-island structure. The organic phosphorous flame retardant or the flame retardant antidrip agent, which configures the resin composition, is dispersed to either the continuous phase (sea) or the dispersed phase (island). In addition, in the resin composition according to the exemplary embodiment, the specific surface area of the dispersed phase is 2 or greater.

It is considered that the molecular weight of the reaction product of the polyethylene terephthalate resin and the glycidyl group-containing polyethylene copolymer is increased compared to that of the unreacted polyethylene terephthalate resin which is not subjected to a reaction with the glycidyl group-containing polyethylene copolymer. In addition, it is considered that the glycidyl group-containing polyethylene copolymer itself functions as an elastomer having a rubbery elastic body by being cooled. Since the reaction product having a high molecular weight and a function as an elastomer exists in the resin composition, the surface impact strength of an obtainable resin molded article is enhanced compared to a case where the reaction product does not exist in the resin composition.

In addition, in the resin phase separation structure (sea-island structure), in which the polycarbonate resin and the unreacted polyethylene terephthalate resin form a continuous phase, the reaction product of the polyethylene terephthalate resin and the glycidyl group-containing polyethylene copolymer forms a dispersed phase, the increase of the specific surface area of the dispersed phase indicates that dispersivity of the reaction product in the resin composition is high. In addition, it is considered that since the specific surface area of the dispersed phase in the resin phase separation structure is 2 or greater, as the resin composition of the exemplary embodiment, the reaction product having a high molecular weight in the resin composition and a function as an elastomer becomes a dispersed state, and the surface impact strength of the obtainable resin molded article is further enhanced, compared to a case where the specific surface area of the dispersed phase is less than 2.

Here, in the observation of the resin phase separation structure by an electron microscope, a well-known technology is applied. In general, since the phase separation structure in the resin composition is retained after melt molding, a molded article formed by injection molding the resin composition is used to observe the structure in the exemplary embodiment. For example, a method is exemplified, in which the center portion in the cross-sectional direction of the test sample formed by injection molding the resin composition is cut by a square of 1 mm, the reaction product of the polyethylene terephthalate resin and the glycidyl group-containing polyethylene copolymer is dyed with ruthenium tetroxide, and then, an ultrathin slice having a size of 0.1 μm or less (about 80 nm) is cut by an ultramicrotome at a temperature of −196° C., and the cut slice is magnified 35,000 times to be observed by a transmission electron microscope (manufactured by JOEL Ltd. JEM-2100). Then, the resin phase separation structure of the continuous phase and the dispersed phase is confirmed based on the obtained image.

The specific surface area of the dispersed phase is a value obtained by the following formula (1). The denominator of the following formula (1) is a volume of the dispersed phase, the numerator of the following formula (1) is a surface area of the dispersed phase, and these are obtained by, for example, using image analysis software "Image J" manufactured by the National Institutes of Health based on the obtained image.

$$A = \frac{\sum_{i} N \times 4\pi r_i^2}{\sum_{i} \frac{N \times 4\pi r_i^3}{3}}$$ Formula (1)

A: Specific surface area of dispersed phase
N: The number of dispersed phase in an observation view
$r_i$: Radius of the i-th dispersed phase In the resin composition of the exemplary embodiment, the specific surface area of the dispersed phase in the resin phase separation structure may be 2 or greater, and the specific surface area of the dispersed phase in the resin phase separation structure is more preferably 2.7 or greater, from a viewpoint of enhancing the surface impact strength and strength stability.

The volume and the surface area of the dispersed phase in the formula (1) are not particularly limited, as long as the surface area of the dispersed phase is within the range of 2 or greater. The volume of the dispersed phase is preferably in the range from, for example, 15,000 to 50,000 and the surface area of the dispersed phase is preferably in the range from, for example, 70,000 to 130,000.

In addition, the organic phosphorous flame retardant and the flame retardant antidrip agent in the resin composition of the exemplary embodiment contribute to enhancement of flame retardancy of the resin molded article. Due to the combination of these substances and a glycidyl group-containing polyethylene resin, for example, when the resin molded article is burned, since a char layer tends to be formed on the surface of the resin molded article, it is considered that flame retardancy of the resin molded article is enhanced.

Each raw material, for example, the polycarbonate resin, the glycidyl group-containing polyethylene copolymer, the polyethylene terephthalate resin, the organic phosphorous flame retardant, and the flame retardant antidrip agent is put into a well-known melting kneader such as a twin-screw extruder and molten-kneaded to obtain the resin composition. A molten-kneaded product including the reaction product of the glycidyl group-containing polyethylene copolymer and the polyethylene terephthalate resin may be put into a melting kneader. The specific surface area of the dispersed phase in the resin phase separation structure is adjusted by, for example, a barrel (cylinder) temperature of the kneader used at the time of molten kneading, shear force imparted to the resin composition, residence time, a packing factor, and the like. In a case where the specific surface area of the dispersed phase in the resin phase separation structure is 2 or greater, the cylinder temperature is preferably set to, for example, a temperature from −30° C. to 10° C. lower than the melting point of the polyethylene terephthalate resin configuring the reaction product, and the specific energy is preferably set in the range from 0.120 kWh/kg to 0.170 kWh/kg. In addition, the above range of the cylinder temperature and the specific energy is different from the normal range which is set in consideration of productivity of the resin composition.

Hereinafter, each component configuring the resin composition according to the exemplary embodiment will be described.

Reaction Product

The reaction product of the polyethylene terephthalate resin and the glycidyl group-containing polyethylene copolymer is a reaction product, in which, for example, an end group of the polyethylene terephthalate resin and a glycidyl group of the glycidyl group-containing polyethylene copolymer are bonded to each other. Since the polyethylene terephthalate resins are bonded to each other via a glycidyl group-containing polyethylene copolymer, it is considered that the reaction product has an increased molecular weight compared to the unreacted polyethylene terephthalate resin which is not subjected to a reaction with the glycidyl group-containing polyethylene copolymer.

Hereinafter, the reaction product of the polyethylene terephthalate resin and the glycidyl group-containing polyethylene copolymer is referred to as a "reaction product". In addition, the polyethylene terephthalate resin reacted with the glycidyl group-containing polyethylene copolymer, that is, the polyethylene terephthalate resin in the reaction product is referred to as a "reacted polyethylene terephthalate resin", and an unreacted polyethylene terephthalate resin which is not subjected to a reaction with the glycidyl group-containing polyethylene copolymer is referred to as an "unreacted polyethylene terephthalate resin". In addition, in a case where the polyethylene terephthalate resin in the resin composition is referred to, the polyethylene terephthalate resin in the resin composition refers to both the reacted and unreacted polyethylene terephthalate resin.

The content of the reacted polyethylene terephthalate resin (polyethylene terephthalate resin in the reaction product) is preferably 3% by weight or greater, more preferably from 3.5% by weight to 20% by weight, and still more preferably from 5% by weight to 15% by weight with respect to the total amount of the reaction product. If the content of the reacted polyethylene terephthalate resin is less than 3% by weight, an existing amount of the reaction product with an increased molecular weight in the resin composition (substantially, polyethylene terephthalate resin with an increased molecular weight) may be decreased compared to a case where the content of the reacted polyethylene terephthalate resin satisfies the above range and the surface impact strength of the obtainable resin molded article may be degraded. In addition, in a case where the polyethylene terephthalate resin in the reaction product exceeds 20% by weight, the same surface impact strength is obtained as the case where the content of the reacted polyethylene terephthalate resin is from 3% by weight to 20% by weight, but productivity of the reaction product may be lowered.

The content of the reacted polyethylene terephthalate resin in the resin composition is measured by the following method. An insoluble matter obtained when an operation of dissolving a measurement sample in chloroform and cleansing the measurement sample is repeated 3 times is fractionated, and an operation of dissolving the insoluble matter in HFIP (1,1,1,3,3,3-hexafluoro-2-propanol) and cleansing the insoluble matter is repeated 3 times. The insoluble matter in HFIP is fractionated, dried, and added with CDCL3 as a swelling solvent, and then the insoluble product is measured by gel NMR.

Hereinafter, one example of a method for preparing a reaction product will be described.

For example, a mixture of the polyethylene terephthalate resin and the glycidyl group-containing polyethylene copolymer is molten-kneaded by a twin-screw extruder and an end group of the polyethylene terephthalate resin and a glycidyl group of the glycidyl group-containing polyethylene copolymer are bonded to each other so as to obtain a molten-kneaded product including the reaction product of the polyethylene terephthalate resin and the glycidyl group-containing polyethylene copolymer. Normally, since it is difficult to undergo a reaction of all of the charged polyethylene terephthalate resins, the unreacted polyethylene terephthalate resin is included in the molten-kneaded product, in addition to the reaction product. Therefore, if the above molten-kneaded product is used in the above preparation of the resin composition, the polyethylene terephthalate resin may not be separately added and mixed. In addition, the polyethylene terephthalate resin and the unreacted glycidyl group-containing polyethylene copolymer may exist in the molten-kneaded product, which may depend on the charged amount of the copolymer.

It is considered that the glycidyl group-containing polyethylene copolymer is a substance which tends to cause a self-reaction by being heated. Thus, it is preferable to molten-knead the polyethylene terephthalate resin and then add the glycidyl group-containing polyethylene copolymer so as to perform molten-kneading, from a viewpoint of enhancing reactivity of the polyethylene terephthalate resin and the glycidyl group-containing polyethylene copolymer and increasing the content the reacted polyethylene terephthalate resin, compared to a case where a mixture of the polyethylene terephthalate resin and the glycidyl group-containing polyethylene copolymer is molten-kneaded or a case where the glycidyl group-containing polyethylene copolymer is previously molten-kneaded by polyethylene terephthalate.

It is preferable to charge the other raw materials of the resin composition, in particular, the organic phosphorous flame retardant, after molten-kneading of the polyethylene terephthalate resin and the glycidyl group-containing polyethylene copolymer is completed, or during the molten-kneading (for example, after a half of the molten-kneading time is passed). If the other raw materials of the resin composition, is particular, the organic phosphorous flame retardant, is charged at the same time when the polyethylene terephthalate resin and the glycidyl group-containing polyethylene copolymer start to be molten-kneaded or before a half of the molten-kneading time is passed, there may be a case where the increase in a free volume or the decrease in a molten resin temperature at the time of adding the organic phosphorous flame retardant is caused so that reactivity of the polyethylene terephthalate resin and the glycidyl group-containing polyethylene copolymer is degraded.

The melting kneader used for molten-kneading is preferably a twin-screw extruder, and may be a conventionally used melting kneader such as a single-screw extruder without being particularly limited. As the temperature at the time of molten-kneading, the barrel (cylinder) temperature is preferably in the range from, for example, 220° C. to 280° C. and a die temperature is preferably in the range from, for example, 220° C. to 280° C. The molten-kneading time is appropriately set depending on the charged amount of the raw materials, and for example, the average residence time is preferably 10 minutes or less if the twin-screw extruder is used.

The content of the reaction product in the resin composition is preferably in the range from, for example, 3% by weight to 15% by weight and more preferably from 4% by weight to 10% by weight. In a case where the content of the reaction product satisfies the above range, molding fluidity of the resin may be enhanced and the surface impact strength of the resin molded article may be enhanced compared to a case where the content of the reaction product does not satisfy the above range.

The glycidyl group-containing polyethylene copolymer is a copolymer including an ethylene unit and a (meth)acrylate unit having a glycidyl group. Examples of the (meth)acrylate unit having a glycidyl group include a constitutional unit derived from a monomer such as glycidyl(meta)acrylate, vinyl glycidyl ether, (meta)acrylglycidyl ether, 2-methyl propenyl glycidyl ether, styrene-p-glycidyl ether, glycidyl cinnamate, itaconic acid glycidyl ester, and N-[4-(2,3-epoxypropoxy)-3,5-dimethyl benzyl]methacrylamide. Among these, glycidyl(meta)acrylate is preferable from a viewpoint of obtaining a polyethylene copolymer having a glass phase transition point of 0° C. or less. In addition, "(meth)acryl" means either acryl or methacryl.

The glycidyl group-containing polyethylene copolymer is composed of an ethylene unit and a (meth)acrylate unit having a glycidyl group, has the content of the (meth)acrylate unit having a glycidyl group in the glycidyl group-containing polyethylene copolymer from 2% by weight to 20% by weight, and is preferably a copolymer in which a polymerizable vinyl monomer is graft polymerized on the main chain of the polyethylene copolymer having a glass phase transition point of 0° C. or less or the polyethylene copolymer composed of an ethylene unit and a (meth)acrylate unit having a glycidyl group. This glycidyl group-containing polyethylene copolymer is composed of an ethylene unit and a (meth)acrylate unit having a glycidyl group, and it is considered that impact resistance of the obtainable resin molded article is further enhanced compared to the polyethylene copolymer having the content of the (meth)acrylate unit having a glycidyl group less than 2% by weight or exceeding 20% by weight in the glycidyl group-containing polyethylene copolymer. In addition, if the content of the (meth)acrylate unit having a glycidyl group in the glycidyl group-containing polyethylene copolymer is less than 2% by weight, the high molecular weight of an aromatic polycarbonate resin or aromatic polyester resin is not obtained compared to a case where the content of the (meth)acrylate unit having a glycidyl group in the glycidyl group-containing polyethylene copolymer satisfies the above range, and if the content exceeds 20% by weight, it is considered that fluidity of the resin composition is degraded compared to a case where the content satisfies the above range. In addition, if the glass phase transition point exceeds 0° C., it is considered that elasticity of the obtainable resin molded article is degraded compared to a case where the glass phase transition point is 0° or less.

The glass phase transition point of the polyethylene copolymer means a glass phase transition point measured as follows. That is, a calorie spectrum is measured every minute under a condition of the temperature rising rate of 10° C. using a differential calorie measuring apparatus (manufactured by Shimadzu Corporation, differential scanning calorimeter DSC-60) and an intermediate value (Tgm) between the two shoulder values obtained by a tangential line method from the peak derived from glass transition is set to a glass phase transition point.

Examples of the method for preparing the glycidyl group-containing polyethylene copolymer include a method for living polymerizing the ethylene unit and the monomer configuring the (meth)acrylate unit having a glycidyl group. Examples of the living polymerization methods include an anionic polymerization method in which organic alkali metal compounds are used as a polymerization initiator and anionic polymerization is performed in the presence of mineral acid salts such as salts of alkali metals or alkali earth metals, an anionic polymerization method in which organic alkali metal compounds are used as a polymerization initiator and anionic polymerization is performed in the presence of organic aluminum compounds, a polymerization method in which organic rare earth metal complexes are used as a polymerization initiator, and a radical polymerization method in which α-halogenated ester compound is used as an initiator and radical polymerization is performed in the presence of copper compounds.

In addition, as a method for preparing the copolymer in which the polymerizable vinyl monomer is graft polymerized on the main chain of the polyethylene copolymer, a method is exemplified, in which the polymerizable vinyl monomer is added to the polyethylene copolymer to perform radical polymerization in a single stage or multiple stages.

Examples of the polymerizable vinyl monomer include an ester vinyl monomer unit, an aromatic vinyl monomer unit, and a vinyl cyanide monomer unit. Examples of the ester vinyl monomer unit include methyl(meta)acrylate, ethyl (meta)acrylate, butyl(meta)acrylate, isobutyl(meta)acrylate, 2-ethyl hexyl(meta)acrylate. Examples of the aromatic vinyl monomer include styrene and vinyl naphthalene. Examples of the vinyl cyanide monomer acrylonitrile, α-chloroacrylonitrile, and methacrylonitrile.

The weight average molecular weight of the glycidyl group-containing polyethylene copolymer is preferably from, for example, 3,000 to 100,000 and more preferably from 5,000 to 50,000. In a case where the weight average molecular weight of the glycidyl group-containing polyethylene copolymer is less than 3,000, impact resistance may be degraded compared to a case where the weight average molecular weight of the glycidyl group-containing polyethylene copolymer satisfies the above range, and in a case where the weight average molecular weight of the glycidyl group-containing polyethylene copolymer exceeds 100,000, dispersivity of the resin composition may be degraded compared to a case where the weight average molecular weight satisfies the above range.

The weight average molecular weight (and number average molecular weight) is measured by GPC (Gel Permeation Chromatography). The measurement of the molecular weight using GPC is performed by using GPC•HLC-8120 manufactured by TOSOH CORPORATION as a measuring apparatus and using column•TSK gel Super HM-M (15 cm) manufactured by TOSOH CORPORATION and hexafluoroisopropanol as a solvent. The weight average molecular weight (and number average molecular weight) is calculated by using a molecular weight calibration curve created by a monodispersed polystyrene standard sample from the measurement result. The measurement of the weight average molecular weight and number average molecular weight are the same as follows.

The content of the glycidyl group-containing polyethylene copolymer is preferably from, for example, 2% by weight to 15% by weight and more preferably from 3% by weight to 10% by weight with respect to the total amount of the polyethylene terephthalate resin and the polycarbonate resin in the resin composition. The case where the content of the glycidyl group-containing polyethylene copolymer satisfies the above range may enhance impact resistance of the obtainable resin molded article compared to a case where the content does not satisfy the above range.

The content of the polyethylene terephthalate resin in the resin composition is preferably from, for example, 10% by weight to 50% by weight and more preferably from 20% by weight to 40% by weight with respect to the total amount of the polyethylene terephthalate resin and the polycarbonate resin in the resin composition. In addition, the content of the unreacted polyethylene terephthalate resin in the resin composition is preferably from, for example, 10% by weight to 50% by weight and more preferably from 20% by weight to 40% by weight with respect to the total amount of the polyethylene terephthalate resin and the polycarbonate resin in the resin composition. The case where the content of the polyethylene terephthalate resin and the unreacted polyethylene terephthalate resin in the resin composition satisfies the above range may enhance molding fluidity of the resin and surface impact strength of the resin molded article, compared to a case where the content does not satisfy the above range.

The weight average molecular weight of the polyethylene terephthalate resin in the resin composition is preferably from, for example, 5,000 to 100,000. In addition, the number average molecular weight of the polyethylene terephthalate resin of the exemplary embodiment is preferably from, for example, 5,000 to 50,000. In a case where the weight average molecular weight of the polyethylene terephthalate resin is less than 5,000 and the number average molecular weight is less than 5,000, fluidity of the resin composition may be increased and workability of the resin molded article may be degraded compared to a case where the number average molecular weight and the weight average molecular weight satisfy the above range. In addition, in a case where the weight average molecular weight of the polyethylene terephthalate resin exceeds 100,000 and the number average molecular weight exceeds 50,000, fluidity of the resin composition may be degraded and workability of the resin molded article may be degraded compared to a case where the number average molecular weight and the weight average molecular weight satisfy the above range.

An acid value of the polyethylene terephthalate resin in the resin composition is preferably from 10 eq/t to 15 eq/t. In a case where the acid value of the polyethylene terephthalate resin is from 10 eq/t to 15 eq/t, it is considered that the high molecular weight of the polyethylene terephthalate resin is obtained since the resin has many end groups reacting with the glycidyl group compared to a case where the acid value of the polyethylene terephthalate resin is less than 10 eq/t, and surface impact strength of the resin molded article is enhanced. In addition, it is considered that excessive reaction with the glycidyl group is prevented and a polyethylene terephthalate component is prevented from being gelated compared to a case where the acid value of the polyethylene terephthalate resin exceeds 15 eq/t. In addition, prevention of the polyethylene terephthalate component from being gelated prevents degradation of molding fluidity of the resin composition, and accordingly it is considered that the surface impact strength is further enhanced. The acid value of the polyethylene terephthalate is adjusted by solid phase polymerization. In addition, a method of measuring the acid value will be described in the Examples described later.

The polyethylene terephthalate resin in the resin composition preferably includes a collected polyethylene terephthalate resin (hereinafter, may be referred to as a recycled PET resin) collected from the market. Since the recycled PET resin has been hydrolyzed compared to the PET resin before being released to the market, the recycled PET resin tends to be a PET resin having an acid value from 10 eq/t to 15 eq/t. Accordingly, it is considered that surface impact strength of the resin molded article is enhanced.

The recycled PET resin is prepared by for example, collecting the resin molded article of the PET resin from the market and pulverizing the article using a crusher such as a dry-type or wet-type crusher. The content of the recycled PET resin is preferably from, for example, 30% or greater and more preferably 40% or greater of the aromatic polyester resin (B) included in the resin composition. In a case where the content of the recycled PET resin is 30% or greater, tensile elongation at break of the resin molded article may be degraded compared to a case where the content of the recycled PET resin does not satisfy the above range.

Polycarbonate Resin

The polycarbonate resin includes aromatic polycarbonate, polyorganosiloxane-containing aromatic polycarbonate, aliphatic polycarbonate, alicyclic polycarbonate, and the like. In view of the surface impact strength of the resin molded article, the aromatic polycarbonate resin is preferable. Examples of the aromatic polycarbonate resin include bisphenol A-type, Z-type, S-type, MIBK-type, AP-type, TP-type, biphenyl-type, and bisphenol A water addition-type polycarbonates.

For example, the polycarbonate resin is prepared by reaction of dihydric phenol and a carbonate precursor.

Examples of the dihydric phenol include 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether and bis(4-hydroxyphenyl)ketone.

Examples of the carbonate precursor include carbonyl halide, carbonyl ester, and haloformate, and more specifically, include phosgene, dihaloformate of dihydric phenol, diphenyl carbonate, dimethyl carbonate, and diethyl carbonate.

The weight average molecular weight (Mw) of the polycarbonate resin is preferably in the range from 50,000 to 600,000. If the weight average molecular weight of the polycarbonate resin is in the range from 50,000 to 600,000, the surface impact strength of the resin molded article may be further enhanced, compared to the case in which the above range is not satisfied. In addition, the number average molecular weight (Mn) of the polycarbonate resin is preferably in the range from 10,000 to 30,000. If the number average molecular weight of the polycarbonate resin is less than 10,000, fluidity of the resin composition may become excessive to deteriorate workability of the resin molded article, and if the number average molecular weight of the polycarbonate resin is greater than 30,000, fluidity of the resin composition may decrease to deteriorate workability of the resin molded article.

The content of the polycarbonate resin is preferably in the range from, for example, 60% by weight to 90% by weight and more preferably in the range from 40% by weight to 80% by weight with respect to the total amount of the polyethylene terephthalate resin (including the polyethylene terephthalate resin present in the reaction product and the unreacted polyethylene terephthalate resin) and the polycarbonate resin in the resin composition. The case where the content of the polycarbonate resin satisfies the above range may enhance molding fluidity of the resin composition and surface impact strength of the resin molded article compared to the case where the content of the polycarbonate resin does not satisfy the above range.

The terminal hydroxyl group concentration of the polycarbonate resin of the exemplary embodiment is preferably from 10 µeq/g to 15 µeq/g. In a case where the terminal hydroxyl group concentration of the polycarbonate resin is from 10 µeq/g to 15 µeq/g, surface impact strength of the obtainable resin molded article may be enhanced compared to a case where the terminal hydroxyl group concentration of the polycarbonate resin is less than 10 µeq/g. In addition, molding fluidity of the resin composition may be prevented from being degraded and surface impact strength may be enhanced compared to a case where the terminal hydroxyl group concentration of the polycarbonate resin exceeds 15 µeq/g. The terminal hydroxyl group concentration of the polycarbonate resin, in a case of the virgin (unused) resin, is adjusted by the addition amount of a terminal sealing agent in a polymerization step. In addition, in a collected polycarbonate resin (hereinafter, may be referred to as a recycled PC resin) collected from the market, the terminal hydroxyl group concentration is changed depending on the used state in the market. Also, a method for measuring the terminal hydroxyl group concentration will be described in the field of Examples.

The polycarbonate resin according to the exemplary embodiment preferably contains the recycled PC resin. In the recycled PC resin, the hydrolysis progresses, compared to the polycarbonate resin before being released to the market, and accordingly, the polycarbonate resin is easily caused to have the terminal hydroxyl group concentration in the range of 10 µeq/g to 15 µeq/g. Therefore, it is considered that the surface impact strength of the resin molded article is enhanced.

For example, the recycled PC resin is prepared by collecting the resin molded article of the polycarbonate resin from the market, and pulverizing the collected resin molded articles with a crusher such as a dry-type or a wet-type crusher. For example, the content of the recycled PC resin is preferably in the range from 10% to 90% and more preferably in the range from 20% to 80%, of the polycarbonate resin included in the resin composition. If the content of the recycled PC resin is in the range from 10% to 90%, the impact resistance of the resin molded article is further enhanced, compared to the case where the above range is not satisfied.

Organic Phosphorous Flame Retardant

Examples of the organic phosphorous flame retardant include aromatic phosphate ester, aromatic condensed phosphate ester, phosphinic acid salt, and polyphosphate having a triazine skeleton. As an organic phosphorous flame retardant, a synthetic product or a commercial product may be used. As commercial products of the organic phosphorous flame retardant, "CR-741" manufactured by Daihachi Chemical Industry Co., Ltd., "AP422" manufactured by Clariant, and "Nova Excel 140" manufactured by Rin Kagaku Kogyo Co., Ltd. are included.

Flame Retardant Antidrip Agent

Examples of the flame retardant antidrip agent include fluorine resins such as polytetrafluoroethylene, polyvinylidene fluoride, and polyhexafluoropropylene. Due to the flame retardant antidrip agent, resin drip at the time of the burning of the resin molded article is prevented.

Other Components

The resin composition according to the exemplary embodiment may contain other components without deteriorating the surface impact resistance and the flame retardancy of the obtainable resin molded article. Examples of the other components include a hydrolysis inhibitor, an antioxidant, and a filler.

Examples of the hydrolysis inhibitor include a carbodiimide compound, and an oxazoline compound. Examples of the carbodiimide compound include dicyclohexylcarbodiimide, diisopropylcarbodiimide, dimethylcarbodiimide, diisobutyl carbodiimide, dioctyl carbodiimide, diphenyl carbodiimide, and naphthylcarbodiimide.

Examples of the antioxidant include phenol, amine, phosphorus, sulfur, hydroquinone, and quinoline antioxidants.

Examples of the filler include clay such as kaolin clay, bentonite clay, kibushi clay, and gairome clay, talc, mica, and montmorillonite.

Resin Molded Article

The resin molded article according to the exemplary embodiment includes a resin composition according to the exemplary embodiment. For example, the above resin composition according to the exemplary embodiment is molded, for example, by a molding method such as injection molding, extrusion molding, blow molding, and hot press molding, to obtain the resin molded article according to the exemplary embodiment. According to the exemplary embodiment, in view of the dispersivity of the respective components in the resin molded article, the resin molded article is preferably obtained by injection-molding the resin composition according to the exemplary embodiment.

The injection molding may be conducted by using a commercially available apparatuses such as "NEX 150" and "NEX 70000" manufactured by Nissei Plastic Industrial Co., Ltd., and "SE50D" manufactured by Toshiba Machine Co., Ltd. At this time, the cylinder temperature is preferably from 170° C. to 280° C. In addition, is view of productivity and the like, a mold temperature is preferably from 30° C. to 120° C.

The resin molded article according to the exemplary embodiment is appropriately used for electronic and electrical apparatuses, home appliances, containers, and interior materials for automobiles. More specifically, examples of the usage include housings, various components, or the like of home appliances or electronic and electrical apparatuses, wrapping films, storage cases of CD-ROM, DVD, or the like, tableware, food tray, drink bottle, medicine wrapping materials. Among these, the resin molded article according to the exemplary embodiment is preferably used for components of electronic and electrical apparatuses. Specifically, the components of electronic and electrical apparatuses require high impact resistance and flame retardancy. Also, the resin molded article according to the exemplary embodiment which is obtainable from the resin composition described above has enhanced surface impact strength and flame retardancy, compared with the resin molded article obtainable from a resin composition formed of a polycarbonate resin, a polyethylene terephthalate resin, an organic phosphorous flame retardant, and a flame retardant antidrip agent.

EXAMPLES

The invention is described in detail with reference to examples and comparative examples, but the invention is not limited thereto.

Polycarbonate Resin

The polycarbonate resin (hereinafter, referred to as a PC resin) used in Examples or Comparative Examples is a recycled PC resin originated from a beverage bottle.

Polyethylene Terephthalate Resin

The polyethylene terephthalate resin (hereinafter, referred to as a PET resin) used in Examples or Comparative Examples is a recycled PET resin originated from a beverage bottle made of PET.

The weight average molecular weights (Mw), number average molecular weights (Mn) Mw/Mn, and terminal hydroxyl group concentrations of the PC resins and acid values of the PET resins are collectively shown in Table 1.

Measurement of Terminal Hydroxyl Group Concentration

The terminal hydroxyl group concentration (μeq/g) of the PC resin indicates the number of the phenolic terminal hydroxyl group existing in 1 g of the PC resin, and the measurement method thereof is colorimetry by a titanium tetrachloride/acetic acid method (method described in Macromol. Chem. 88215 (1965)).

Measurement of Acid Value

The acid value of the PET resin is measured in the following order.

Adjustment of Sample

A sample is pulverized, is vacuum-dried for 24 hours at 70° C., and is weighed in a range of 0.20±0.0005 g using a scale. The weight at the point is set to be W (g) The 10 ml of benzyl alcohol and the weighed sample are added to a test tube, the test tube is immersed into an oil bath heated to 205° C., and the sample is melted while stirred by a glass rod. Samples having a melting time of 3 minutes, 5 minutes, and 7 minutes are designated as A, B, and C, respectively. Subsequently, a new test tube is prepared, and only benzyl alcohol is introduced and treated in the same order. Samples having a melting time of 3 minutes, 5 minutes, and 7 minutes are designated as a, b, and c, respectively.

Titration

The titration of the samples is performed by using 0.04 mol/l of potassium hydroxide solution (ethanol solution) of which the factor is known in advance. Phenol red is used as an indicator, a point in which the color of the sample is changed from yellowish green to pink is set to be the end point, and the titration amounts (ml) of the potassium hydroxide solutions at the end point are obtained. The titration amounts of the samples A, B, and C are set to be XA, XB, and XC (ml), and the titration amounts of the samples a, b, and c are set to be Xa, Xb, and Xc (ml).

Calculation of Acid Value

The titration amounts V (ml) at the melting time 0 are obtained in the least-squares method by using the titration amounts XA, XB, and XC at the respective melting times. In the same manner, the titration amounts V0 (ml) are obtained by using Xa, Xb, and Xc.

Subsequently, the acid values are obtained by the following equation.

Acid value (eq/t)=[(V−V0)×0.04×NF×1,000]/W

NF: Factor of 0.04 mol/l of potassium hydroxide solution
W: Weight of sample (g)

TABLE 1

| Polycarbonate resin | | Mw | Mn | Mw/Mn | Terminal hydroxyl group concentration (μeq/g) |
|---|---|---|---|---|---|
| PC resin | Originated from drink bottle | 58,500 | 19,400 | 3.02 | 12 |

| Polyethylene terephthalate resin | | Acid value (eq/t) | |
|---|---|---|---|
| PET resin | Originated from PET drink bottle | 15 | |

Glycidyl Group-Containing Polyethylene Copolymer

The glycidyl group-containing polyethylene copolymer is "AX8900" manufactured by ARKEMA, and is a glycidyl methacrylate/ethylene/methyl acrylate copolymer. A composition ratio of glycidyl methacrylate/ethylene/methyl acrylate is 8/68/24 (% by weight). A glass phase transition point (Tg) of the glycidyl group-containing polyethylene copolymer is −33° C.

Example 1

After 78.95 parts by weight of the PET resin and 21.05 parts by weight of the glycidyl group-containing polyethylene copolymer are mixed in a tumbler, the mixture is molten-kneaded using a twin-screw extruder with a vent (manufactured by The Japan Steel Works, LTD.: TEX-30α, L/D=49) at a barrel (cylinder) temperature and a die temperature of 260° C., a screw speed of 240 rpm, a vent suction degree of 100 MPa, and a discharge amount of 10 kg/h to obtain a pellet. The obtained pellet is dried using a hot air drier at 90° C. for 4 hours so as to obtain a molten-kneaded product C-1.

The molten-kneaded product C-1 includes a reaction product of the glycidyl group-containing polyethylene copolymer and the PET resin, and the unreacted PET resin which is not subjected to a reaction with the glycidyl group-containing polyethylene copolymer, and the amount of the reacted PET resin in the reaction product is 5.9% by weight with respect to the total amount of the reaction product. The method for measuring the content is as described above.

Next, after 70 parts by weight of the PC resin, 38 parts by weight of the molten-kneaded product C-1, 1 part by weight of the flame retardant antidrip agent (product name "A-3800", polytetrafluoroethylene content of 50%, manufactured by Mitsubishi Rayon Co., Ltd.), and 0.2 parts by weight of an antioxidant (phenolic antioxidant, product name "Irganox 1076", manufactured by BASF Japan Ltd.) are mixed in a tumbler, the barrel (cylinder) temperature is set to slowly increase such that an initial period is 200° C. an intermediate period is 220° C., and a later period is 230° C., and the die temperature is set to 250° C. in a twin-screw extruder with a vent. A screw which includes three kneading zones is used. The mixture is molten-kneaded at a screw speed of 240 rpm, a vent suction degree of 100 MPa, and a discharge amount of 10 kg/h. Further, an aromatic condensed phosphate ester flame retardant (product name "CR-741", phosphorus content of 9%, manufactured by DAIHACHI CHEMICAL INDUSTRY CO., LTD.) is additionally added thereto during molten-kneading. Specifically, the barrel of the twin-screw extruder with a vent is divided into 14 segments in a longitudinal direction (raw material extrusion direction), and 15 parts by weight of the aromatic condensed phosphate ester flame retardant is added from the input port provided on the 8th segment.

In addition, the resin discharged from the twin-screw extruder is cut to have a pellet shape. The obtained resin composition having a pellet shape is dried at a temperature of 90° C. for 4 hours using a hot air drier, and then injection molded at a cylinder temperature of 260° C. and a mold temperature of 60° C. using an injection molding machine (product name "NEX 500", manufactured by TOSHIBA MACHINE CO., LTD.) so as to obtain a resin molded article (test sample for evaluation).

As a result of observing the obtained resin molded article using a transmission electron microscope (manufactured by JOEL Ltd. JEM-2100) according to the above method, the PC resin and the unreacted PET resin form a continuous phase, and a reaction product of the glycidyl group-containing polyethylene copolymer and the PET resin forms a dispersed phase, which is a resin phase separation structure (sea-island structure). The same sea-island structure is confirmed in other Examples and Comparative Examples below.

In addition, as a result of obtaining the specific surface area of the dispersed phase using image analysis software "Image J" manufactured by the National institutes of Health based on the above image obtained by the transmission electron microscope, the specific surface area is 2.7.

Comparative Example 1

A molten-kneaded product C-1 is obtained similarly to Example 1. In the molten-kneaded product C-1, the reacted PET resin in the reaction product is 5.9% by weight with respect to the total amount of the reaction product.

In addition, a resin molded article (test sample for evaluation) is obtained under the same condition as Example 1 except that the barrel (cylinder) temperature is uniformly set to 260° C. and the die temperature is set to 260° C. in a twin-screw extruder with a vent and a screw which includes two kneading zones is used. The obtained resin molded article is observed using a transmission electron microscope (manufactured by JOEL Ltd. JEM-2100) according to the above method. As a result of obtaining the specific surface area of the dispersed phase using image analysis software "Image J" manufactured by the National institutes of Health based on the obtained image, the specific surface area is 1.8.

Example 2

After 70 parts by weight of the PC resin, 30 parts by weight of the PET resin, 8 parts by weight of the glycidyl group-containing polyethylene copolymer, 1 part by weight of the flame retardant antidrip agent (product name "A-3800", polytetrafluoroethylene content of 50%, manufactured by Mitsubishi Rayon Co., Ltd.), and 0.2 parts by weight of an antioxidant (phenolic antioxidant, product name "Irganox 1076", manufactured by BASF Japan Ltd.) are mixed in a tumbler, the mixture is put into a twin-screw extruder with a vent, and 15 parts by weight of an aromatic condensed phosphate ester flame retardant (product name "CR-741", phosphorus content of 9%, manufactured by DAIHACHI CHEMICAL INDUSTRY CO., LTD.) is added thereto by 1.21 kg/h from the input port provided on the 8th segment to perform molten-kneading. The molten-knead condition is such that the 2nd to 7th segment is set to high temperature kneading (barrel (cylinder) temperature of 270° C.), the 8th to 14th segment is set to low temperature kneading (barrel (cylinder) temperature of 230° C.), the screw speed is set to 240 rpm, a vent suction degree is set to 100 MPa, and a discharge amount is set to 10 kg/h. A screw which includes three kneading zones is used. In addition, the resin discharged from the twin-screw extruder is cut to have a pellet shape. The obtained resin composition having a pellet shape is dried at a temperature of 90° C. for 4 hours using a hot air drier.

The reaction product of the glycidyl group-containing polyethylene copolymer and the PET resin, and the unreacted PET resin which is not subjected to a reaction with the glycidyl group-containing polyethylene copolymer are included in the resin composition having a pellet shape, and the amount of the reacted PET resin in the reaction product is 3.4% by weight with respect to the total amount of the reaction product.

In addition, the resin composition having a pellet shape is injection molded at a cylinder temperature of 260° C. and a mold temperature of 60° C. using an injection molding machine (product name "NEX 500", manufactured by TOSHIBA MACHINE CO., LTD.) so as to obtain a resin molded article (test sample for evaluation).

The obtained resin molded article is observed using a transmission electron microscope (manufactured by JOEL Ltd. JEM-2100) according to the above method. As a result of obtaining the specific surface area of the dispersed phase using image analysis software "Image J" manufactured by the National Institutes of Health based on the obtained image, the specific surface area is 2.0.

Comparative Example 2

A resin molded article (test sample for evaluation) is obtained under the same condition as Example 2 except that the barrel temperature of the twin-screw extruder with a vent is set to such that the 2nd to 7th segment is set to high temperature kneading (barrel (cylinder) temperature of 270° C.), the 8th to 14th segment is set to low temperature kneading (barrel (cylinder) temperature of 260° C.). The obtained resin molded article is observed using a transmission electron microscope (manufactured by JOEL Ltd. JEM-2100) according to the above method. As a result of obtaining the specific surface area of the dispersed phase using image analysis software "Image J" manufactured by the National institutes of Health based on the obtained image, the specific surface area is 1.8.

Example 3

After 70 parts by weight of the PC resin, 30 parts by weight of the PET resin, 8 parts by weight of the glycidyl group-containing polyethylene copolymer, 1 part by weight of the flame retardant antidrip agent (product name "A-3800", polytetrafluoroethylene content of 50%, manufactured by Mitsubishi Rayon Co., Ltd.), and 0.2 parts by weight of an antioxidant (phenolic antioxidant, product name "Irganox 1076", manufactured by BASF Japan Ltd.) are mixed in a tumbler, the mixture is put into a twin-screw extruder with a vent, and 15 parts by weight of an aromatic condensed phosphate ester flame retardant (product name "CR-741", phosphorus content of 9%, manufactured by DAIHACHI CHEMICAL INDUSTRY CO., LTD.) added thereto by 1.21 kg/h from the input port provided on the 3rd segment to set the barrel (cylinder) temperature to slowly increase such that an initial period is 200° C., an intermediate period is 220° C., and a later period is 230° C., and the die temperature is set to 250° C. A screw which includes three kneading zones is used. The molten-kneading is performed under the condition of a screw speed of 240 rpm, a vent suction degree of 100 MPa, and a discharge amount of 10 kg/h. In addition, the resin composition discharged from the twin-screw extruder is cut to have a pellet shape. The obtained resin composition having a pellet shape is dried at a temperature of 90° C. for 4 hours using a hot air drier.

The reaction product of the glycidyl group-containing polyethylene copolymer and the PET resin, and the unreacted PET resin which is not subjected to a reaction with the glycidyl group-containing polyethylene copolymer are included in the resin composition having a pellet shape, and the amount of the reacted PET resin in the reaction product is 2.8% by weight with respect to the total amount of the reaction product.

The resin composition having a pellet shape is injection molded at a cylinder temperature of 260° C. and a mold temperature of 60° C. using an injection molding machine (product name "NEX 500", manufactured by TOSHIBA MACHINE CO., LTD.) so as to obtain a resin molded article (test sample for evaluation).

The obtained resin molded article is observed using a transmission electron microscope (manufactured by JOEL Ltd. JEM-2100) according to the above method. As a result of obtaining the specific surface area of the dispersed phase using image analysis software "Image J" manufactured by the National Institutes of Health based on the obtained image, the specific surface area is 2.0.

Comparative Example 3

A resin molded article (test sample for evaluation) is obtained under the same condition as Example 3 except that the barrel (cylinder) temperature is uniformly set to 260° C. and the die temperature is set to 260° C. in a twin-screw extruder with a vent and a screw which includes two kneading zones is used. The obtained resin molded article is observed using a transmission electron microscope (manufactured by JOEL Ltd. JEM-2100) according to the above method. As a result of obtaining the specific surface area of the dispersed phase using image analysis software "Image J" manufactured by the National Institutes of Health based on the obtained image, the specific surface area is 1.9.

Comparative Example 4

After 70 parts by weight of the PC resin, 30 parts by weight of the PET resin, 1 part by weight of the flame retardant antidrip agent (product name "A-3800", polytetrafluoroethylene content of 50%, manufactured Mitsubishi Rayon Co., Ltd.), and 0.2 parts by weight of an antioxidant (phenolic antioxidant, product name "Irganox 1076", manufactured by BASF Japan Ltd.) are mixed in a tumbler, the mixture is put into a twin-screw extruder with a vent, and 15 parts by weight of an aromatic condensed phosphate ester flame retardant (product name "CR-741", phosphorus content of 9%, manufactured by DAIHACHI CHEMICAL INDUSTRY CO., LTD.) is added thereto by 1.21 kg/h from the input port provided on the 3rd segment to perform molten-kneading at a barrel temperature and die temperature of 260° C., a screw speed of 240 rpm, a vent suction degree of 100 MPa, and a discharge amount of 10 kg/h. In addition, the resin composition discharged from the twin-screw extruder is cut to have a pellet shape. The obtained resin composition having a pellet shape is dried at a temperature of 90° C. for hours using a hot air drier.

The resin composition having a pellet shape is injection molded at a cylinder temperature of 260° C. and a mold temperature of 60° C. using an injection molding machine (product name "NEX 500", manufactured by TOSHIBA MACHINE CO., LTD.) so as to obtain a resin molded article (test sample for evaluation).

Evaluation and Test

The following evaluation and test is performed by using the obtainable test samples for evaluation. Compositions of the resin compositions of Examples 1 to 3 and Comparative Examples 1 to 4 (all are parts by weight), the content of the reacted PET resin, and the test results are collectively shown in Table 2.

Flame Retardancy Test

UL-V tests are conducted using UL test samples (0.8 mm and 1.5 mm of thicknesses) for V test in UL-94 in conformity with a method regulated in UL-94, to measure a degree of flame retardancy of the test samples. Here, degrees of the flame retardancy in the UL-94 standard are not-V, V-2, V-1, V-0, and 5VB in an ascending order of the flame retardancy.

Test of Heat Resistance

In a state of applying a load (1.8 MPa) determined in a test method standard of ASTM D648 to a test sample, a temperature of the test sample for evaluation is increased, a temperature in which a size of deflection becomes a specific value (deflection temperature under load: DTUL) is measured. This is estimated as a heat resistant temperature.

Test of Tensile Strength and Tensile Elongation at Break

The tensile strength and the tensile elongation at break of the test sample are measured in conformity with JIS K-7113. Further, as a molded article, a test sample (thickness of 4 mm) of JIS1 obtained by injection molding is used. As a value of the tensile strength is greater, the tensile strength is better. As a value of the tensile elongation at break is greater, the tensile elongation at break is better.

Test of Impact Resistance

Charpy impact resistance strength (Unit: $kJ/m^2$) is measured by using a product obtained by performing notch process on an ISO multipurpose dumbbell test sample, in conformity with ISO-179, with a digital impact tester (DG-5 manufactured by Toyo Seiki Seisaku-Sho Ltd.) in the MD direction, in the condition in which a rising angle is 150°, an energy of the used hammer is 2.0 J, a number of measurement is n=10. As the value of the Charpy impact resistance strength is greater, the impact resistance is better.

Surface Impact Strength Test 60 mm×60 mm of flat plates having 2 mm and 1.8 mm of the thickness are prepared by injection molding. A test sample obtained by cutting a 10 mm×10 mm square hole on the center of each flat plate is prepared. On the center of the test sample, a steel ball having 50 mm of the diameter and 500 g of the weight is dropped and impacted at the height in a range of 0.7 m to 2 m, and the surface impact strength is evaluated in the following conditions. The test of the surface impact strength is performed three times at respective heights. In addition, it is considered that the evaluation of A at 1.3 m of the steel ball dropping height is preferable in practice.

A: No crack is formed near square hole of test sample.
B: 1 to 3 cracks are formed near square hole of test sample.
C: Test sample is broken into plural pieces.

Test of Strength of Louver Portion (Opening Portion)

Figure 1:
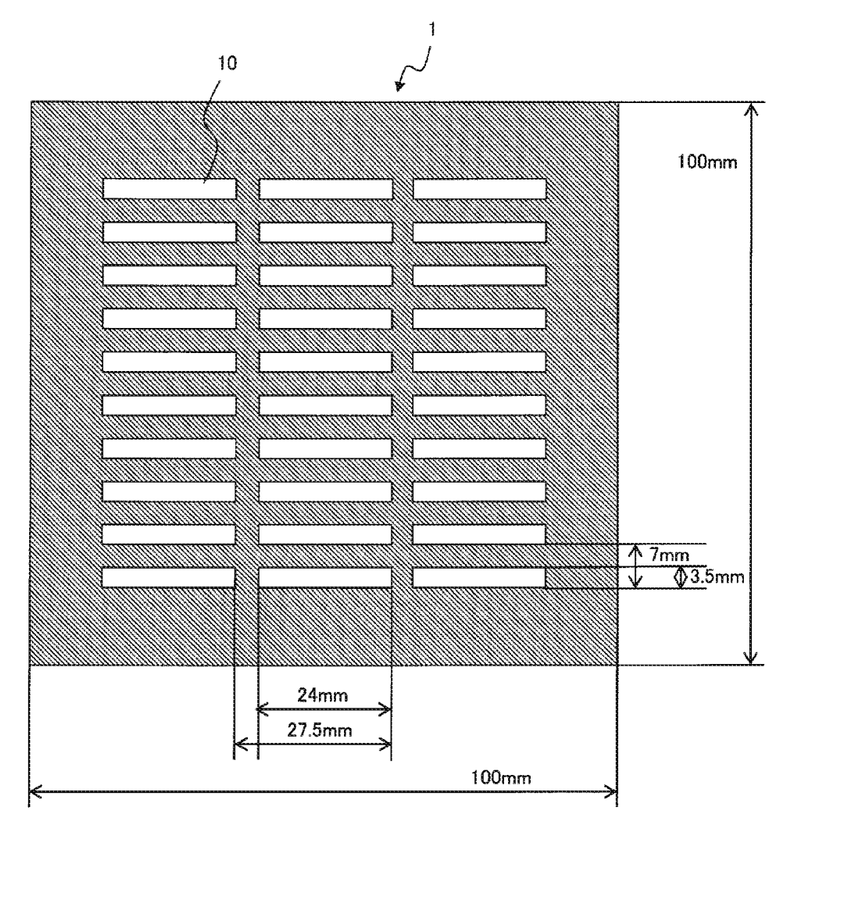
FIG. 1 is a schematic plane view of a test sample used for a louver portion strength test.

A test sample 1 having a grid-shaped louver portion 10 (opening portion), 2 mm and 1.8 mm of the thickness as illustrated in FIG. 1 is molded by using an injection molding machine. A steel ball having 50 mm of the diameter and 500 g of the weight is dropped and impacted at 1.3 m of the height on the center of the test sample 1 illustrated in FIG. 1, and the louver portion strength is evaluated in the following conditions. The test of the louver portion strength is performed three times. In addition, it is considered that the evaluation of A at 1.3 m of the steel ball dropping height is preferable in practice.

A: No crack is formed in test sample or only 1 mm or less of small cracks in thickness direction are formed.
B: One or two fractures are formed around louver portion.
C: Three or more fractures are formed around louver portion.

TABLE 2

| | Composition | Example 1 | Comparative Example 1 | Example 2 | Comparative Example 2 | Example 3 | Comparative Example 3 | Comparative Example 4 |
|---|---|---|---|---|---|---|---|---|
| Resin composition (parts by weight) | PC resin | 70 | 70 | 70 | 70 | 70 | 70 | 70 |
| | PET resin | | | 30 | 30 | 30 | 30 | 30 |
| | Molten-kneaded product C-1 | 38 | 38 | | | | | |
| | Glycidyl group-containing polyethylene copolymer | | | 8 | 8 | 8 | 8 | |
| | Aromatic condensed phosphate ester flame retardant | 15 | 15 | 15 | 15 | 15 | 15 | 15 |
| | Flame retardant antidrip agent | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 |
| Content of reacted PET resin (% by weight) | | 5.9 | 5.9 | 3.4 | 3.4 | 2.8 | 2.8 | — |
| Specific surface area of dispersed phase | | 2.7 | 1.8 | 2 | 1.8 | 2 | 1.9 | — |
| Evaluation result Flame retardancy | UL94 flame retardancy (thickness of 0.8 mm) | | | | | | | |
| | UL94 flame retardancy (thickness of 1.5 mm) | V-0 | V-0 | V-0 | V-0 | V-0 | V-1 | not-V |
| | | 5VB | 5VB | 5VB | 5VB | 5VB | 5VB | V-2 |
| Heat resistance | DTUL(1.8 MPa) | 75.4 | 72.4 | 72 | 72 | 72 | 71.2 | 69.8 |
| Mechanical properties | Tensile strength (MPa) | 62 | 61 | 60 | 60 | 60 | 60 | 56 |
| | Tensile elongation at break (%) | 80 | 75 | 48 | 48 | 48 | 42 | 3 |
| | Charpy impact resistance strength ($kJ/m^2$) | 25 | 22 | 24 | 20 | 24 | 17 | 1 |
| Surface impact strength Flat plate Thickness 2.0 mm | Dropping height 0.7 m | AAA | AAA | AAA | AAA | AAA | AAA | CCC |
| | Dropping height 1.0 m | AAA | AAA | AAA | AAA | AAA | AAA | CCC |
| | Dropping height 1.3 m | AAA | AAA | AAA | AAA | AAA | AAA | CCC |
| | Dropping height 1.6 m | AAA | AAA | AAA | AAA | AAA | AAA | CCC |
| | Dropping height 2.0 m | AAA | AAA | AAA | AAB | AAA | ABB | CCC |
| Louver portion Strength Thickness 2.0 mm | Dropping height 1.3 m | AAA | AAA | AAA | AAA | AAA | AAA | CCC |
| Surface impact strength Flat plate Thickness 1.8 mm | Dropping height 0.7 m | AAA | AAA | AAA | AAA | AAA | AAA | CCC |
| | Dropping height 1.0 m | AAA | AAA | AAA | AAA | AAA | AAA | CCC |
| | Dropping height 1.3 m | AAA | AAA | AAA | AAA | AAA | ABB | CCC |
| | Dropping height 1.6 m | AAA | ABB | AAA | BBB | ABB | BBC | CCC |
| | Dropping height 2.0 m | AAA | BBC | AAC | CCC | ABC | CCC | CCC |
| Louver portion Strength Thickness 1.8 mm | Dropping height 1.3 m | AAA | AAA | AAA | AAB | ABB | BCC | CCC |

As shown in Table 2, the resin molded articles of Examples 1 to 3 and Comparative Examples 1 to 3 obtained from the resin composition containing the PC resin, the reaction product of the glycidyl group-containing polyethylene copolymer and the PET resin, the unreacted PET resin, the organic phosphorous flame retardant, and the flame retardant antidrip agent have enhanced surface impact strength and flame retardancy, compared with the resin molded article in Comparative Example 4 obtained from the resin composition containing the PC resin, the PET resin, the organic phosphorous flame retardant, and the flame retardant antidrip agent. In addition, in the resin phase separation structure (sea-island structure) in which the PC resin and the unreacted polyethylene terephthalate resin form a continuous phase and the reaction product forms a dispersed phase, the resin molded articles of Examples 1 to 3 in which the specific surface area of the dispersed phase is 2 or greater have enhanced surface impact strength, compared with the resin molded articles of Comparative Examples 1 to 3 in which the specific surface area of the dispersed phase is less than 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polycarbonate resin;
   a reaction mixture of a glycidyl group-containing polyethylene copolymer and a polyethylene terephthalate resin;
   an unreacted polyethylene terephthalate resin that is not subjected to a reaction with the glycidyl group-containing polyethylene copolymer;
   an organic phosphorous flame retardant; and
   a flame retardant antidrip agent,
   wherein in a resin phase separation structure observed by an electron microscope, the polycarbonate resin and the unreacted polyethylene terephthalate resin form a continuous phase, the reaction mixture forms a dispersed phase, and a specific surface area of the dispersed phase is 2 or greater.

2. The resin composition according to claim 1, wherein a weight average molecular weight of the polycarbonate resin is from 50,000 to 600,000.

3. The resin composition according to claim 1, wherein a content of the polycarbonate resin is from 60% by weight to 90% by weight with respect to a total amount of the polyethylene terephthalate resin present in the reaction mixture, the unreacted polyethylene terephthalate resin, and the polycarbonate resin in the resin composition.

4. The resin composition according to claim 1, wherein a content of the polyethylene terephthalate resin in the reaction mixture is from 3.5% by weight to 20% by weight with respect to the total amount of the reaction mixture.

5. The resin composition according to claim 1, wherein a content of the reaction mixture is from 3% by weight to 15% by weight.

6. The resin composition according to claim 1, wherein the specific surface area of the dispersed phase is 2.7 or greater.

7. A resin molded article comprising the resin composition according to claim 1.

* * * * *